Aug. 24, 1926.
W. A. GEIGER
1,597,444
FRICTION SHOCK ABSORBING MECHANISM
Filed July 9, 1923    2 Sheets-Sheet 2
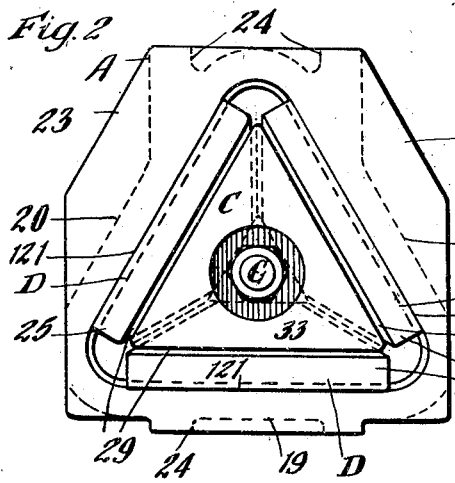
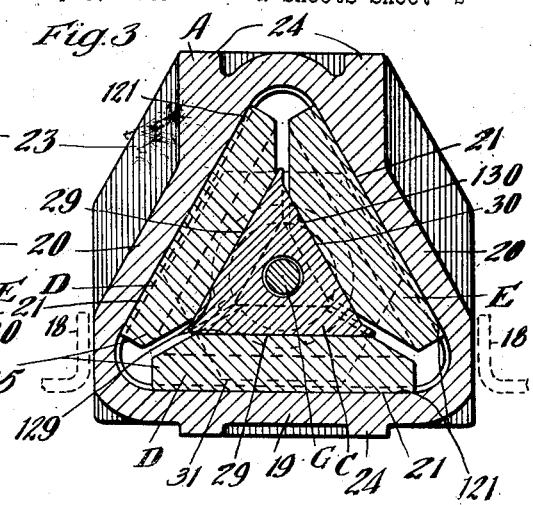
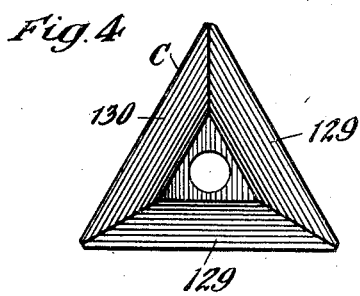
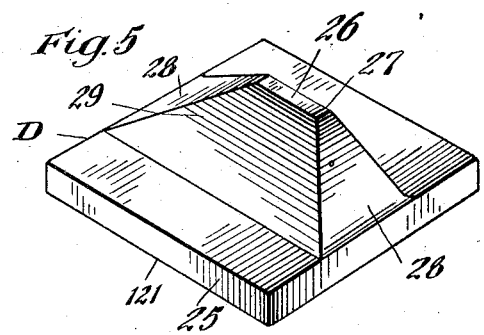
Witnesses
Hans M. Rachlitz
Inventor
William A. Geiger
By George J. Haight
His Atty.

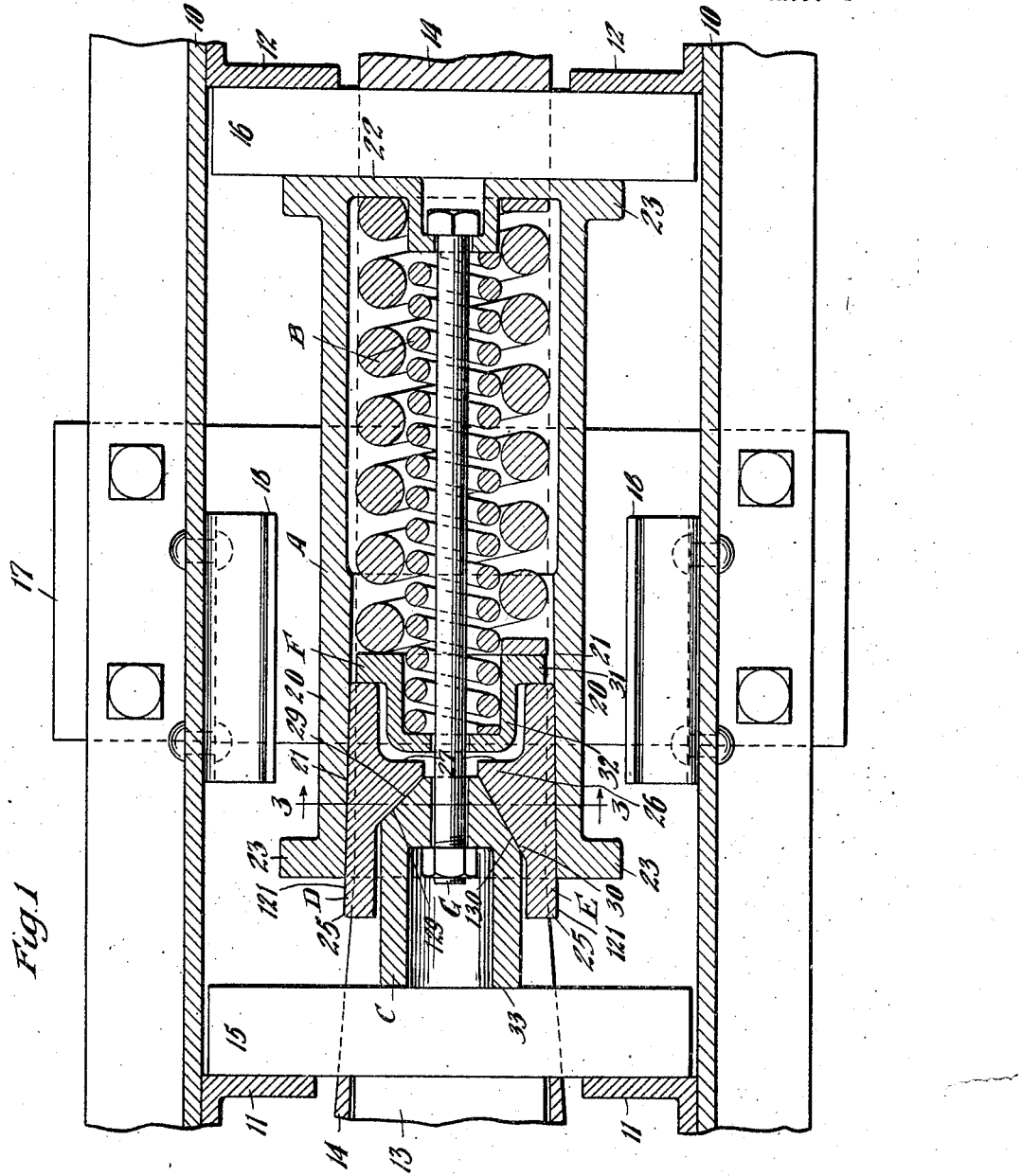

Patented Aug. 24, 1926.

1,597,444

UNITED STATES PATENT OFFICE.

WILLIAM A. GEIGER, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 9, 1923. Serial No. 650,339.

This invention relates to improvements in friction shock absorbing mechanisms.

One object of the invention is to provide a friction shock absorbing mechanism, especially adapted for railway draft riggings, of economical design, comprising few parts, having high capacity and certain release.

Another object of the invention is to provide a mechanism employing flat shell friction surfaces so arranged as to economize on the amount of material required for the shell, and at the same time so arranged that the friction surfaces insure balanced pressure on all sides.

A more specific object of the invention is to provide a friction shell of triangular cross-section which may be accommodated in the usual draft gear space and between the arms of yokes used in commercial practice.

In the drawings forming a part of this specification, Figure 1 is a horizontal, longitudinal, sectional view of a portion of a railway draft rigging, showing my improvements in connection therewith, the section through the shock absorbing mechanism proper, however, corresponding to two intersecting planes at 120° to each other. Fig. 2 is a front end elevation of the shock absorbing mechanism proper. Fig. 3 is a vertical, transverse, sectional view of the shock absorbing mechanism proper, corresponding to the line 3—3 of Fig. 1. Fig. 4 is an end elevational view of the wedge employed with my construction. And Fig. 5 is a detailed perspective of one of the friction shoes.

In said drawings, 10—10 denote the usual draft sills of a car underframe, to the inner faces of which are secured front stop lugs 11 and rear stop lugs 12. A portion of the draw bar is indicated at 13, to which is operatively connected a hooded cast yoke 14. Within the yoke 14 are disposed the shock absorbing mechanism proper, hereinafter described, a front follower 15 and a rear follower 16. The yoke and parts therewithin are supported in operative position by a detachable saddle plate 17. To maintain the combined friction shell and spring cage, hereinafter described, in central position, I preferably employ guide plates 18—18 secured to the inner faces of the draft sills, said guide plates being further illustrated in Fig. 3 to show the manner in which the shell is maintained in central position.

The improved shock absorbing mechanism proper, as shown, comprises a combined friction shell and spring cage casting A; a spring resistance B; a pressure transmitting wedge C; two shoes D—D; a third shoe E; a spring follower F and a retainer bolt G.

The combined friction shell and spring cage casting A, is of triangular cross-section as best shown in Fig. 3, the same having a bottom wall 19 and two upwardly converging walls 20—20. Said walls 19 and 20 are preferably symmetrically arranged with respect to the axis of the mechanism so as to leave an interior of equilateral triangular shape. At the front or outer end of the casting, the inner faces of the walls of the shell are formed to provide longitudinally extending flat friction surfaces 21—21, said surfaces 21 being converged inwardly of the shell. The remainder of the casting provides a cage for the spring resistance B, and, preferably, the casting has an integral rear wall 22 which bears against the rear follower 16. At each end, the casting A is strengthened by suitable flanges 23—23 which somewhat change the appearance of the section of the casting as viewed in end elevation but, as heretofore stated, the main part of the casting is of triangular form throughout. By making one of the walls of the casting horizontal and disposing it at the bottom, I am enabled to accommodate the shell within the arm of a yoke of usual dimensions and also the shell is readily accommodated between two sills spaced the usual distance apart. Furthermore, I provide a flat bottom for the shell adapting it to rest upon the lower arm of the yoke and the upper part of the shell has, in effect, a flat surface to co-operate with the upper arm of the yoke, this effect being obtained by employing longitudinally extending reinforcing ribs 24—24, as best shown in Figure 3.

Three friction shoes D—D and E are employed, each of which is preferably in the form of a heavy thick plate 25 with an inwardly extended projection 26, as shown in Figs. 1 and 5, and having an outer flat friction face 121 co-operating with the corresponding friction face 21 of the cylinder. Each of the projections 26 is so formed as to provide a flat shoulder 27 facing toward the inner end of the shell, and the sides of the projection 26 are tapered away as indicated at 28—28 in order to accommodate said projections within the shell when the shoes are assembled as shown in Figs. 2 and 3. In the case of the two shoes D—D, the lugs 26 are provided on the front or outer sides thereof with faces 29 that are inclined rearwardly and toward the axis of the mechanism at a relatively blunt angle. In the case of the shoe E, a wedge face 30 is provided on the front or outer side of the projection 26, said wedge face 30 extending at a relatively acute or keen angle with respect to the axis of the mechanism. The inner ends of all three shoes normally engage the laterally extended flanged cup-shaped spring follower F. Said flange 31 is preferably of hexagonal contour as indicated best in Fig. 3 so as to be readily accommodated within the triangular friction shell and at the same time provide the necessary bearing for the outer heavy coil of the spring resistance B, it being understood that the inner lighter coil is accommodated within the cup section 32 of the follower F.

The wedge C is preferably in the form of a cored casting having an outer flat face 33 bearing against the front follower 15, and three inner wedge faces 129—129 and 130, inclined and co-operable with the shoe wedge faces 29—29 and 30, respectively.

The retainer bolt G is anchored at its inner end within a hollow boss integral with the casting A and at its front end within the cored recess of the wedge C, the latter and the follower F being suitably apertured to accommodate the shank of the bolt, said bolt serving to retain the parts in assembled position and also to maintain the spring under initial compression.

In operation, assuming an action under buff, the wedge C is forced toward the right, as viewed in Fig. 1. A wedging action is thus set up with said wedge and all three shoes which is greatly augmented as the shoes and wedge travel inwardly of the tapered friction shell. Due to the keen angle employed on the engaging faces of the shoe E and the wedge C, I am enabled to obtain very high capacity without danger of the parts sticking, the blunt angle wedge faces 29 and 129 acting as "safety valves" to prevent the parts from sticking or jamming. I make no specific claim to the specific arrangement of blunt and keen angle wedge faces between the wedge and shoes inasmuch as this forms the subject matter of other pending applications assigned to the same assignee.

By employing a friction shell having three friction surfaces arranged in triangular form and three friction shoes, it will be observed that I am assured of equalized or balanced pressure between all three shoes and the friction surfaces of the shell, even though there may be some irregularities in the location of the various wedge faces of the wedge and shoes. Stated in another manner, by employing a triangular formation, I obtain the main advantages of a cylindrical shell, three shoe and single wedge arrangement, one of the main characteristics of which is to balance pressure between the shoes and shell. With the triangular shell I am enabled to employ flat friction surfaces which more readily accommodate themselves to a finishing operation and at less expense than in the case of curved friction surfaces. Also, for a friction shell employing flat friction surfaces on the interior thereof, I use the minimum amount of metal for a given friction area and over all dimensions.

I have herein shown and described the preferred manner of carrying out the invention, but the same is merely illustrative and all changes and modifications are contemplated that come within the scope of the claims appended hereto.

I claim:

1. In a friction shock absorbing mechanism, the combination with a friction shell having a plurality of longitudinally disposed interior flat friction surfaces, each of said surfaces being transversely inclined with respect to all of the remaining surfaces; of a spring resistance; friction shoes corresponding in number to the friction surfaces of the shell and each having a flat friction surface co-operable with one of said shell surfaces; and wedge means co-operable with said shoes.

2. As an article of manufacture, a friction shell having three interior flat friction surfaces extending longitudinally, each of said surfaces being transversely inclined with respect to the remaining surfaces of the shell.

3. As an article of manufacture, a friction shell having three mutually adjacent interior flat friction surfaces extending longitudinally, said friction surfaces being disposed in triangular formation, providing a set of surfaces; two adjacent surfaces of which diverge transversely of the shell toward the remaining surface thereof, said friction surfaces being also converged inwardly of the shell.

4. In a railway draft rigging, the combination with draft sills having stop acting means and a yoke; of a friction shock absorbing mechanism mounted within the arms of said yoke and between the draft sills, said mechanism including a friction shell of triangular cross-section with one wall thereof extending horizontally and disposed at the bottom, the walls of said shell providing three interior flat friction surfaces, each of said surfaces being transversely inclined with respect to all of the remaining surfaces and defining a triangular interior for the shell.

In witness that I claim the foregoing I have hereunto subscribed my name this 5th day of July 1923.

WILLIAM A. GEIGER.